United States Patent
Dudar

(10) Patent No.: US 10,280,863 B2
(45) Date of Patent: *May 7, 2019

(54) FUEL INJECTOR DIAGNOSTICS IN A VARIABLE DISPLACEMENT ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,346

(22) Filed: Feb. 2, 2017

(65) Prior Publication Data

US 2018/0216562 A1 Aug. 2, 2018

(51) Int. Cl.
| | |
|---|---|
| F02D 7/00 | (2006.01) |
| F02D 41/22 | (2006.01) |
| F02D 13/06 | (2006.01) |
| F02D 41/00 | (2006.01) |
| F02D 41/14 | (2006.01) |
| F02D 41/26 | (2006.01) |
| F02P 5/04 | (2006.01) |
| F02D 1/00 | (2006.01) |
| F02D 41/38 | (2006.01) |

(52) U.S. Cl.
CPC .......... *F02D 41/221* (2013.01); *F02D 13/06* (2013.01); *F02D 41/0087* (2013.01); *F02D 41/1443* (2013.01); *F02D 41/1454* (2013.01); *F02D 41/1497* (2013.01); *F02D 41/26* (2013.01); *F02P 5/045* (2013.01); *F02D 2041/389* (2013.01); *F02D 2200/101* (2013.01); *F02D 2200/1002* (2013.01); *Y02T 10/18* (2013.01); *Y02T 10/40* (2013.01)

(58) Field of Classification Search
CPC .... F02D 17/02; F02D 41/0087; F02D 41/123; F02D 13/06
USPC .................................................. 123/481, 325
See application file for complete search history.

(56) References Cited

U.S. PATENT DOCUMENTS

| | | | | |
|---|---|---|---|---|
| 2005/0131618 A1* | 6/2005 | Megli | ................. | F02D 13/0215 701/101 |
| 2009/0259380 A1* | 10/2009 | Picron | ................. | F02D 41/0087 701/101 |
| 2014/0360477 A1* | 12/2014 | Doering | ................ | F02D 41/144 123/673 |
| 2015/0252742 A1* | 9/2015 | Stroh | .................. | F02D 41/0085 60/274 |

(Continued)

FOREIGN PATENT DOCUMENTS

EP 2912302 B1 12/2016

*Primary Examiner* — John Kwon
(74) *Attorney, Agent, or Firm* — Julia Voutyras; McCoy Russell LLP

(57) ABSTRACT

Methods and systems are provided for diagnosing a degraded fuel injector delivering undesired additional fuel in a variable displacement engine. In one example, a method includes, responsive to an indication of a cylinder air-fuel imbalance, deactivating a subset of cylinders of a multi-cylinder engine, performing a power balance test to determine an output of each cylinder after a duration of deactivation, and indicating that a deactivated cylinder has a degraded fuel injector responsive to the output being lower than a threshold output.

13 Claims, 8 Drawing Sheets

(56) References Cited

U.S. PATENT DOCUMENTS

| | | |
|---|---|---|
| 2016/0018291 A1 | 1/2016 | Uhrich et al. |
| 2016/0115884 A1* | 4/2016 | VanDerWege ...... F02D 41/0087 123/481 |
| 2016/0245221 A1 | 8/2016 | McEwan et al. |
| 2017/0350332 A1* | 12/2017 | Martin ................ F02D 41/0087 |

* cited by examiner

FUEL INJECTOR DIAGNOSTICS IN A VARIABLE DISPLACEMENT ENGINE

FIELD

The present description relates generally to methods for diagnosing a degraded fuel injector in a variable displacement engine.

BACKGROUND/SUMMARY

Vehicle fuel delivery systems may include a direct fuel injector to inject fuel directly into a cylinder of an engine. The direct fuel injector may deliver fuel in proportion to a fuel injector pulse width of a signal from an engine controller. However, due to aging, fuel contamination, or hardware failure, the fuel injector may degrade and deliver undesired additional fuel. When more fuel is delivered to the engine than intended, the engine may run rich and experience an air-fuel ratio (AFR) imbalance between cylinders. An AFR imbalance between cylinders occurs when the AFR in one or more cylinders is different than the other cylinders. Control strategies may be able to correct for the undesired additional fuel by decreasing fueling, for example, using feedback from an exhaust gas oxygen sensor. However, if the amount of undesired additional fuel is considerable, the cylinder receiving fuel from the degraded injector may misfire. Consequently, a non-combusted air-fuel mixture may be displaced into exhaust gas. The non-combusted air-fuel mixture in the exhaust gas may participate in an exothermic reaction at an exhaust treatment catalyst, generating heat that may degrade the catalyst and other exhaust components. Therefore, it is advantageous to quickly identify a degraded fuel injector delivering undesired additional fuel so that mitigating actions may be performed.

Various strategies exist for identifying a degraded fuel injector, for example, by monitoring a change in fuel rail pressure (e.g., by utilizing a pressure sensor) at a start of an injection event or during non-fueling conditions. One example approach is shown by McEwan et al. in U.S. 20160245221 A1. Therein, identifying a degraded fuel injector includes monitoring a change in fuel rail pressure over a period of time during non-fueling conditions, when fuel is shut off to all cylinders. If undesired fuel delivery is absent, then the change in fuel rail pressure may be less than a threshold change. However, if undesired fuel delivery is present, then the change in fuel rail pressure may be greater than or equal to the threshold change.

However, the inventor herein has recognized potential issues with such systems. As one example, although the above method identifies that a degraded fuel injector is present, it may be time consuming to determine which fuel injector is degraded, resulting in lengthy diagnostic and repair procedures. Further, the inventor herein has recognized that variable displacement engine (VDE) technology may be utilized to pinpoint a degraded injector. Variable displacement engines are configured to operate with a variable number of active or deactivated cylinders to increase fuel economy. For example, a portion of the cylinders may be deactivated during selected conditions, wherein the selected conditions are defined by parameters such as an engine speed/load window and vehicle speed. A VDE control system may disable selected cylinders through the control of a plurality of cylinder valve deactivators and by deactivating fuel injectors that fuel the selected cylinders. Thereby, the deactivated cylinders are not fueled, and intake and exhaust valves of the deactivated cylinders are closed. Further, spark is disabled to the deactivated cylinders. However, liquid fuel may accumulate within a deactivated cylinder if the deactivated cylinder has a degraded fuel injector.

Thus, in one example, the issues described above may be addressed by a method comprising, responsive to an indication of an air-fuel combustion gas imbalance from cylinders of an internal combustion engine, deactivating a subset of the cylinders, including deactivating fuel injectors delivering fuel to the cylinder subset; and inferring a first output of each of the cylinders during the deactivation after a duration of deactivation has elapsed. In another example, the method further includes reactivating the subset of cylinders for a duration to expel any liquid fuel; deactivating the subset of cylinders; and inferring a second output of each of the cylinders during the deactivation. In this way, a cylinder with a degraded fuel injector may be conclusively identified responsive to the first output of the cylinder being less than a threshold and the second output of the cylinder being greater than the threshold.

As one example, all of the cylinders of a first engine bank may be deactivated responsive to the air-fuel combustion gas imbalance indicating that the first engine bank is rich relative to a second engine bank. However, hardware limitations may restrict which cylinders may be deactivated and thus, in another example, a subset of cylinders from each engine bank may be deactivated. Therefore, the exact cylinder with the degraded fuel injector may not be conclusively identified, but may be narrowed down from all possible cylinders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
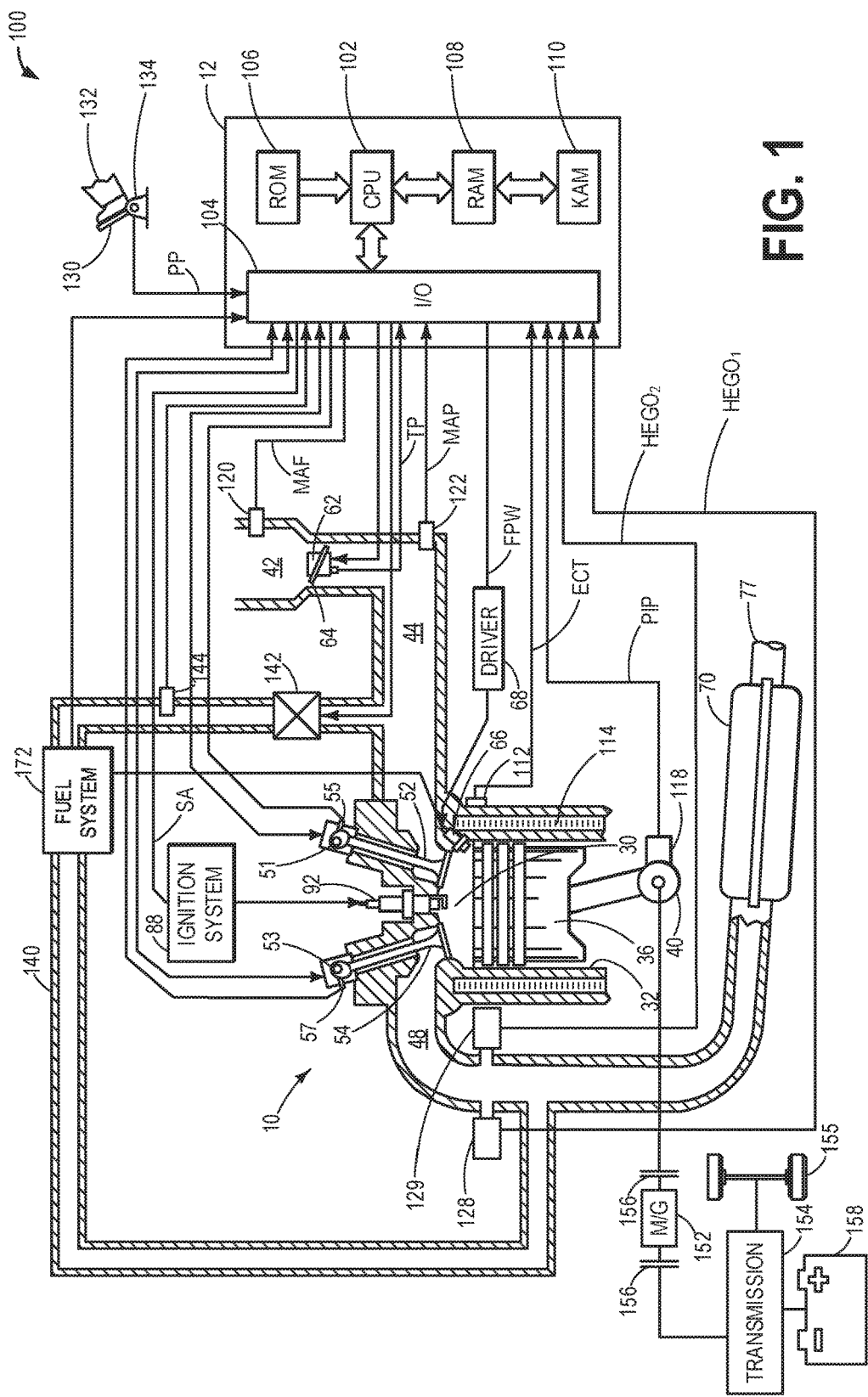
FIG. 1 shows a schematic depiction of an example vehicle system.
Figure 2:
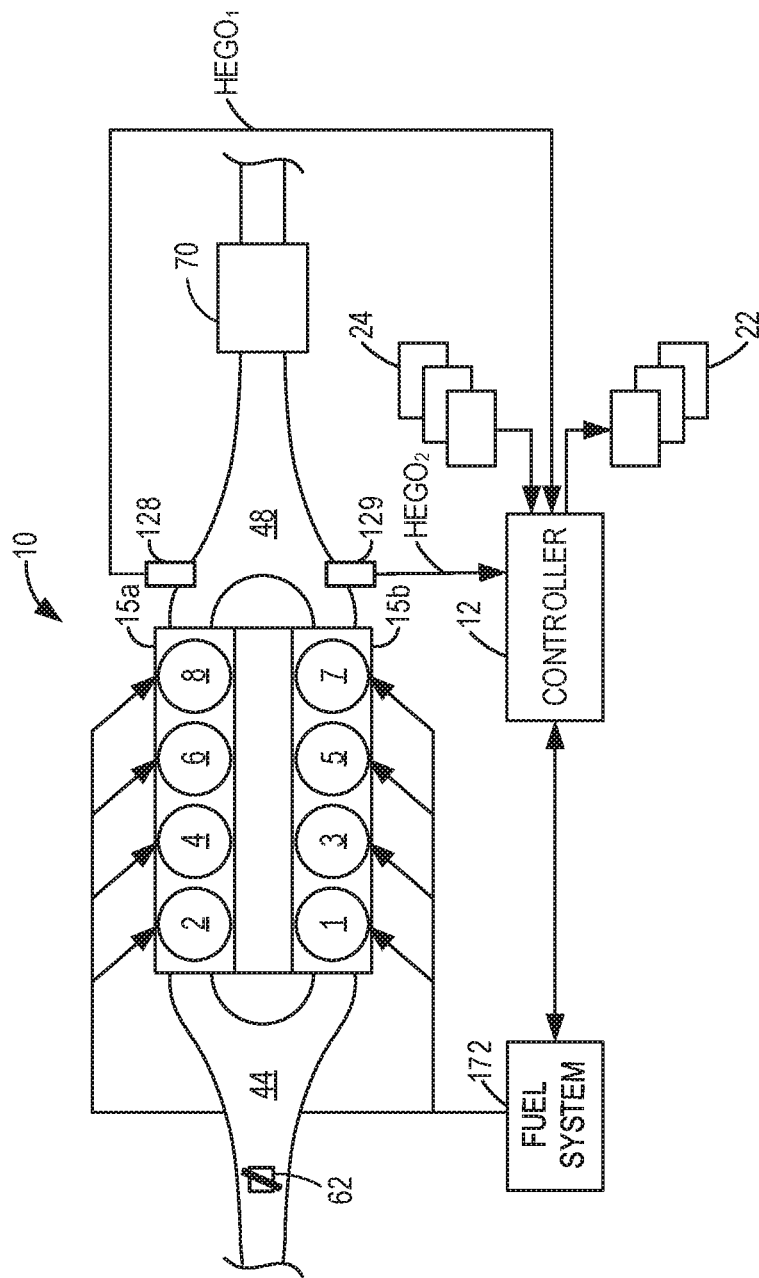
FIG. 2 shows an example layout of a variable displacement engine (VDE) system.
Figure 7:
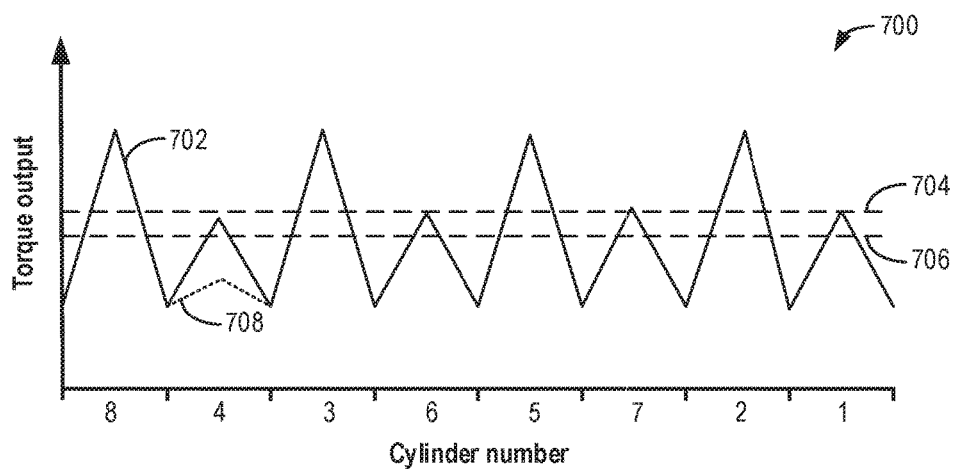
FIG. 7 shows a graph illustrating an example of how a cylinder with a degraded fuel injector delivering undesired additional fuel may be identified in an engine operating in VDE mode using a power balance test.
Figure 8:
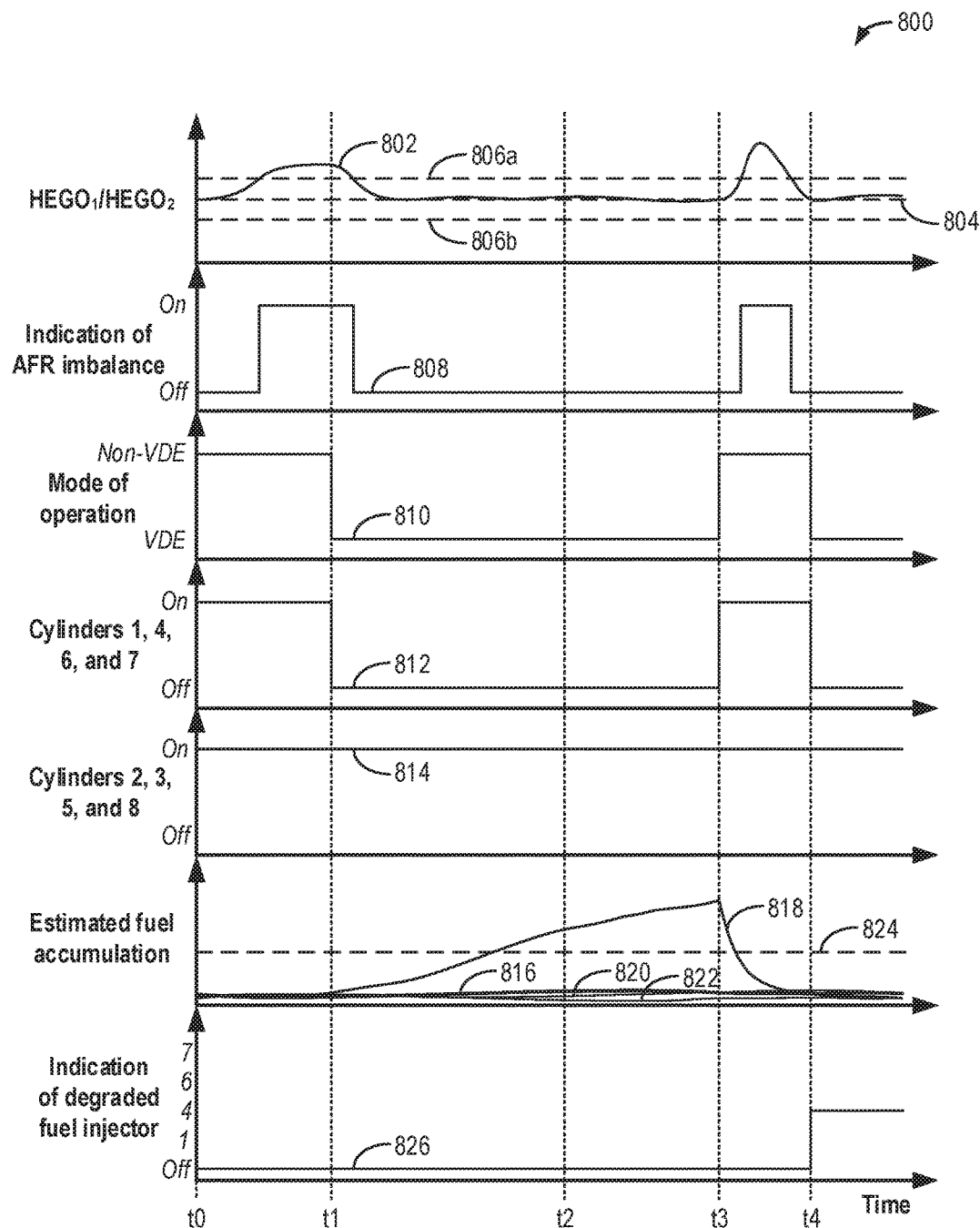
FIG. 8 shows an example timeline for identifying a degraded fuel injector delivering undesired additional fuel responsive to an indication for an AFR imbalance.

The following description relates to systems and methods for identifying a degraded fuel injector delivering undesired additional fuel to a cylinder of an engine of a vehicle system, such as the example vehicle system shown in FIG. 1. As depicted in FIG. 2, the vehicle system may include a multi-cylinder variable displacement engine and multiple exhaust gas oxygen sensors in an exhaust system. An AFR imbalance between cylinders may be indicated according to the example method of FIG. 3. Responsive to the indication of the AFR imbalance, the engine may be operated in VDE mode, for example, according to the method of FIG. 4. A power balance test, an example of which is shown in FIG. 7, may be performed to identify the degraded fuel injector according to the example methods of FIGS. 5 and 6. An example timeline for indicating the AFR imbalance according to the method of FIG. 3 and performing the power balance test according to the method of FIG. 6 is illustrated in FIG. 8.

FIG. 1 illustrates a schematic diagram of a vehicle system 100 showing one cylinder of multi-cylinder engine 10, which may be included in a propulsion system of a vehicle. Engine 10 may be a variable displacement engine (VDE), as described below with regard to FIG. 2. Engine 10 may be controlled at least partially by a control system, including a controller 12, and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. In this example, intake valve 52 may be controlled by controller 12 by cam actuation via cam actuation system 51. Similarly, exhaust valve 54 may be controlled by controller 12 via cam actuation system 53. Cam actuation systems 51 and 53 may each include one or more cams and may utilize one or more of variable displacement engine (VDE), cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by valve position sensors (not shown) and/or camshaft position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system or a variable valve timing actuator or actuation system.

In one example, intake valve 52 and exhaust valve 54 may be deactivated during VDE mode via hydraulically actuated lifters coupled to valve pushrods or via a cam profile switching mechanism in which a cam lobe with no lift is used for deactivated valves. Still other valve deactivation mechanisms may also be used, such as for electrically actuated valves. In one embodiment, deactivation of intake valve 52 may be controlled by a first VDE actuator while deactivation of exhaust valve 54 may be controlled by a second VDE actuator. In alternate embodiments, a single VDE actuator may control deactivation of both intake and exhaust valves of the cylinder. In still other embodiments, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders on a bank. It will be appreciated that if the cylinder is a non-deactivatable cylinder of the VDE engine, then the cylinder may not have any valve deactivating actuators.

In some embodiments, each cylinder of engine 10 may be configured with one or more fuel injectors for providing fuel thereto. As a non-limiting example, cylinder 30 is shown including one fuel injector 66, which is supplied with pressurized fuel from fuel system 172, including a fuel tank for storing fuel. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into cylinder 30.

It will be appreciated that in an alternate embodiment, fuel injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

As used herein, "degraded fuel injector" refers to a fuel injector that continues to deliver a small amount of fuel to the cylinder after deactivation of the fuel injector (e.g., the fuel injector has not fully shut off). For example, additional undesired fuel may be delivered due to a degraded seal between a pintle and a valve seat of the fuel injector or a degraded fuel injector driver (e.g., electronic driver 68).

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30, among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Two upstream exhaust gas sensors 128 and 129 are shown coupled to exhaust passage 48 upstream of emission control device 70. Upstream exhaust gas sensors 128 and 129 may be any suitable sensor for providing an indication of exhaust gas air-fuel ratio, such as a linear wideband oxygen sensor or UEGO (universal or wide-range exhaust gas oxygen); a two-state narrowband oxygen sensor or EGO; a HEGO (heated EGO); or a $NO_x$, HC, or CO sensor. In one embodiment, exhaust gas sensors 128 and 129 are a first HEGO sensor and a second HEGO sensor, respectively, configured to indicate the relative enrichment or enleanment of the exhaust gas. As such, each HEGO sensor may provide output in the form of a switch point, or the voltage signal at the point at which the exhaust gas switches from lean to rich. Controller 12 uses the output to determine the exhaust gas air-fuel ratio.

Emission control device 70 is shown arranged along exhaust passage 48 downstream of exhaust gas sensor 126. Device 70 may be a three-way catalyst (TWC) configured to reduce $NO_x$ and oxidize CO and unburnt hydrocarbons. In some embodiments, device 70 may be a $NO_x$ trap, various other emission control devices, or combinations thereof. Further, in some examples, one or more additional exhaust gas sensors may be coupled to exhaust passage 48 downstream of emission control device 70 to indicate the AFR of the exhaust gas after passing through device 70 and before exiting to atmosphere through tailpipe 77.

As shown in FIG. 1, vehicle system 100 may include an exhaust gas recirculation (EGR) system to route a desired portion of exhaust gas from exhaust passage 48 to intake manifold 44 via EGR passage 140. The amount of EGR provided to intake manifold 44 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

In some examples, vehicle system 100 may be a hybrid vehicle with multiple sources of torque available to one or more vehicle wheels. For example, vehicle system 100 may include engine 10 and an electric machine 152, which may be a motor or a motor/generator. In other examples, vehicle 100 is a conventional vehicle with only an engine. In the example shown, vehicle system 100 includes engine 10 and an electric machine 152. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 40 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge battery 158, for example during a braking operation.

As described above, FIG. 1 shows only one cylinder of a multi-cylinder engine, and each cylinder may similarly include its own set of intake/exhaust valves, fuel injector, spark plug, etc.

FIG. 2 shows an example variable displacement engine 10, which may be engine 10 of FIG. 1. As such, like components of FIGS. 1 and 2 are numbered the same. FIG. 2 shows engine 10 having a first bank 15a and a second bank 15b of cylinders. In the depicted example, engine 10 is a V-8 engine with the first and second banks each having four cylinders. However, in alternate embodiments, the engine may have a different number of engine cylinders, such as 4, 6, 10, 12, etc. As shown, cylinder 2, cylinder 4, cylinder 6, and cylinder 8 comprise first bank 15a, and cylinder 1, cylinder 3, cylinder 5, and cylinder 7 comprise second bank 15b.

Engine 10 has an intake manifold 44, with throttle 62, and an exhaust passage (e.g., exhaust manifold) 48 coupled to an emission control device 70. Two symmetrically opposed exhaust gas oxygen sensors, a first exhaust gas oxygen sensor 128 and a second exhaust gas oxygen sensor 129, are shown coupled to exhaust passage 48 upstream of emission control device 70. As described with respect to FIG. 1, the first and second exhaust gas oxygen sensors 128 and 129 may be any suitable sensors for providing an indication of exhaust gas air-fuel ratio, such as a UEGO, EGO, HEGO, etc. In the depicted embodiment, the first exhaust gas oxygen sensor 128 and second exhaust gas oxygen sensor 129 are HEGO sensors configured to indicate the relative enrichment or enleanment of the exhaust gas prior to passing through emission control device 70. For example, the output voltage of the HEGO sensors may be a nonlinear function of the amount of oxygen present in the exhaust, with a lean feed resulting in a relatively low HEGO sensor voltage and a rich feed resulting in a relatively high HEGO sensor voltage. As shown, first HEGO sensor 128 is positioned to measure zoned exhaust flow from first bank 15a, providing controller 12 with an output signal $HEGO_1$, and second HEGO sensor 129 is positioned to measure zoned exhaust flow from second bank 15b, providing controller 12 with an output signal $HEGO_2$. Emission control device 70 may include one or more catalysts, as described with respect to FIG. 1.

During selected conditions, such as when the full torque capability of the engine is not requested, one of a first or a second cylinder group may be selected for deactivation (herein also referred to as a VDE mode of operation). For example, the first cylinder group may comprise cylinder 1, cylinder 4, cylinder 6, and cylinder 7, and the second cylinder group may comprise cylinder 2, cylinder 3, cylinder 5, and cylinder 8. In another example, the first cylinder group may comprise the cylinders of first bank 15a, and the second cylinder group may comprise the cylinders of second bank 15b. As described above with respect to FIG. 1, each cylinder may include one or more fuel injectors (e.g., fuel injector 66 of FIG. 1) and intake and exhaust valves (e.g., intake valve 52 and exhaust valve 54 of FIG. 1). During VDE mode, cylinders of the selected group of cylinders may be deactivated by shutting off respective fuel injectors and deactivating respective intake and exhaust valves. While fuel injectors of the disabled cylinders are turned off, the remaining enabled cylinders continue to carry out combustion, with corresponding fuel injectors and intake and exhaust valves active and operating. To meet torque requirements, the engine produces the same amount of torque on active cylinders. This requires higher manifold pressures, resulting in lowered pumping losses and increased engine efficiency. Additionally, the lower effective surface area (from only the enabled cylinders) exposed to combustion reduces engine heat losses, improving the thermal efficiency of the engine.

Engine 10 may operate on a plurality of substances, which may be delivered to each cylinder via fuel system 172. Engine 10 may be controlled at least partially by a control system, including controller 12. In addition to $HEGO_1$ from first HEGO sensor 128 and $HEGO_2$ from second HEGO sensor 129, controller 12 may receive various signals from sensors 24 coupled to engine 10 (e.g., MAF sensor 120 of FIG. 1, MAP sensor 122 of FIG. 1, Hall effect sensor 118 of FIG. 1, etc.) and send control signals to various actuators 22 coupled to the engine and/or vehicle (e.g., throttle 62, EGR valve 142 of FIG. 1, fuel injector 66 of FIG. 1, etc.).

Fuel system 172 may be further coupled to a fuel vapor recovery system (not shown), including one or more canisters for storing refueling and diurnal fuel vapors. During selected conditions, one or more valves of the fuel vapor recovery system may be adjusted to purge the stored fuel vapors to the engine intake manifold to increase fuel economy and reduce exhaust emissions. In one example, the purge vapors may be directed near the intake valve of specific cylinders. For example, during a VDE mode of operation, purge vapors may be directed to the cylinders that are firing and not to the deactivated cylinders. This may be achieved in engines configured with distinct intake manifolds for distinct groups of cylinders. Alternatively, one or more vapor management valves may be controlled to direct the purge vapors to active cylinders.

Figure 3:
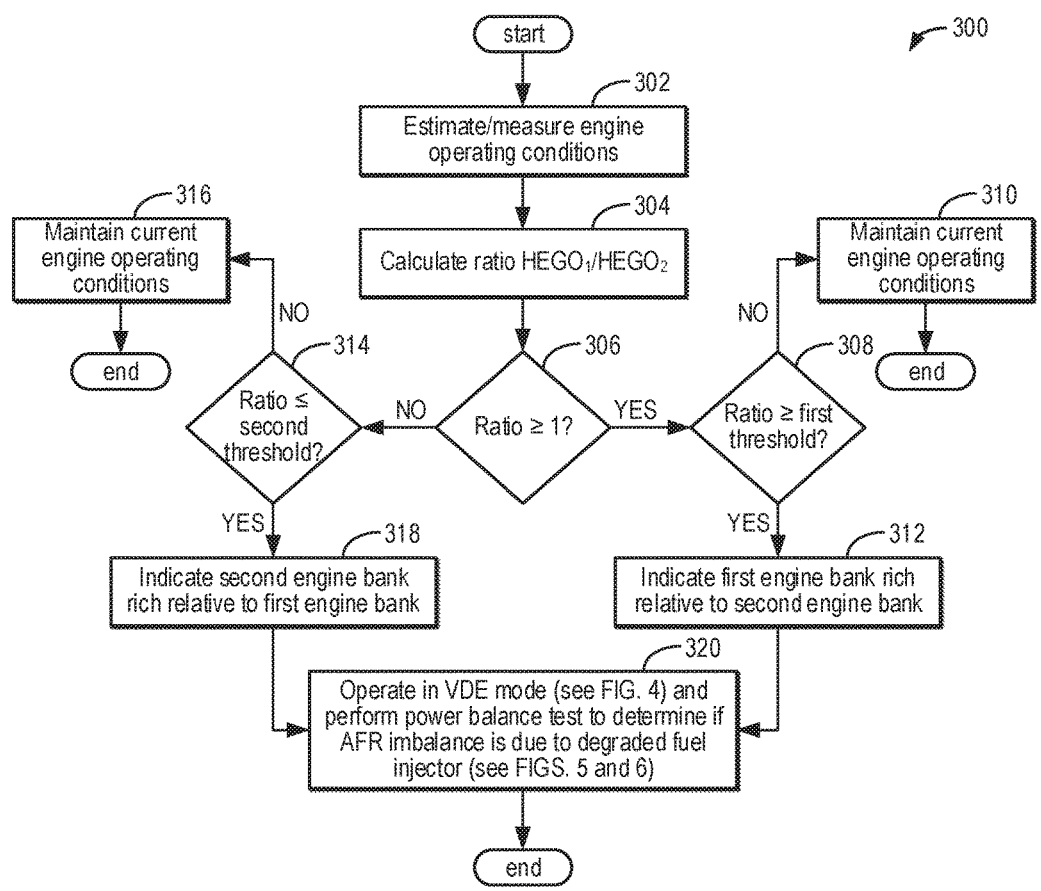
FIG. 3 shows a high-level flow chart illustrating an example method for identifying an AFR imbalance between two engine banks, which may be due to a degraded fuel injector delivering undesired additional fuel.

FIG. 3 shows an example method 300 for identifying an AFR imbalance between two engine banks and, responsive to the AFR imbalance being indicated, operating in VDE mode and performing a power balance test to determine if the AFR imbalance is due to a degraded fuel injector delivering undesired additional fuel to a cylinder. Method 300 and the rest of the methods included herein will be described with reference to the components and systems depicted in FIGS. 1 and 2, although it should be understood that the methods may be applied to other components and systems without departing from the scope of this disclosure. Instructions for carrying out method 300 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2. The controller may employ engine actuators of the engine system, such as the actuators described above with reference to FIGS. 1 and 2, to adjust engine operation according to the methods described below.

Method 300 begins at 302 and includes estimating and/or measuring engine operating conditions. For example, operating conditions may include, but are not limited to, combustion air-fuel ratio, engine coolant temperature, catalyst temperature, etc. Operating conditions may be measured by one or more sensors coupled to the controller, such as a first HEGO sensor (e.g., first HEGO sensor 128 of FIGS. 1 and 2) and a second HEGO sensor (e.g., second HEGO sensor 129 of FIGS. 1 and 2), or may be estimated or inferred from available data.

At 304, method 300 includes calculating a ratio of signal $HEGO_1$ (corresponding to the output of the first HEGO sensor) and signal $HEGO_2$ (corresponding to the output of the second HEGO sensor). For example, the first HEGO sensor may be positioned to measure zoned exhaust from a first engine bank (e.g., first bank 15a), and the second HEGO sensor may be positioned to measure zoned exhaust from a second engine bank (e.g., second bank 15b), as described with respect to FIG. 2. $HEGO_1$ and $HEGO_2$ correspond to time-aligned measurements from each sensor. Further, the HEGO signal ratio may be filtered in order to increase the signal-to-noise ratio of the ratio.

At 306, it is determined if the ratio, as calculated at 304, is greater than or equal to one. If the oxygen concentration of the exhaust flow is uniform, the first ratio of time-aligned signals from the first and second HEGO sensors will equal one. Any non-uniformity in the oxygen concentration of the exhaust flow, for example, due to an AFR imbalance, will result in variation between the HEGO signals, and therefore the ratio will be greater than one or less than one. If the ratio is greater than or equal to one, method 300 proceeds to 308 and includes determining if the ratio is greater than or equal to a first threshold. The first threshold may establish a threshold for the HEGO signal ratio such that if the ratio is greater than one but less than the first threshold, the ratio is approximately equal to one. If the ratio is not greater than or equal to the first threshold, method 300 proceeds to 310 and includes maintaining the current engine operating conditions. For example, a current commanded AFR, operating mode, etc. may be maintained. Further, an AFR imbalance is not indicated, and the controller may continue using $HEGO_1$, $HEGO_2$, or a combination thereof for AFR feedback control. Following 310, method 300 ends.

Returning to 308, if the ratio is greater than or equal to the first threshold, method 300 proceeds to 312 and includes indicating that the first engine bank is rich relative to the second engine bank. For example, if the ratio of $HEGO_1$ and $HEGO_2$ is greater than one, then $HEGO_1$ is greater than $HEGO_2$, indicating that the first HEGO sensor is measuring richer exhaust gas than the second HEGO sensor. However, it should be noted that the AFR measured by either sensor may not necessarily be rich relative to stoichiometry. Indicating that the first engine bank is rich relative to the second engine bank may further include setting a diagnostic trouble code (DTC) indicating that an AFR imbalance is present and illuminating a malfunction indicator light (MIL) on a dash of the vehicle, for example, to alert a vehicle operator to service the vehicle, and may further include indicating the reason for the MIL. However, a conclusive determination as to the source of the AFR imbalance may not be indicated at 312. Method 300 then proceeds to 320, as will be described below.

Returning to 306, if the ratio is not greater than or equal to one (e.g., the ratio is less than one), method 300 proceeds to 314 and includes determining if the ratio is less than or equal to a second threshold. The second threshold may establish a threshold for the HEGO signal ratio such that if the ratio is less than one but greater than the second threshold, the ratio is approximately equal to one. If the ratio is not less than or equal to the second threshold, no AFR imbalance is detected, and method 300 proceeds to 316 and includes maintaining the current engine operating conditions, as described for 310. Following 316, method 300 ends.

If, at 314, the ratio is less than or equal to the second threshold, method 300 proceeds to 318 and includes indicating that the second engine bank is rich relative to the first engine bank. For example, if the ratio of $HEGO_1$ and $HEGO_2$ is less than one, then $HEGO_2$ is greater than $HEGO_1$, indicating that the second HEGO sensor is measuring richer exhaust gas than the first HEGO sensor. However, it should be noted that the air-fuel ratio measured by either sensor may not necessarily be rich relative to stoichiometry. Indicating that the second engine bank is rich relative to the first engine bank may further include setting a DTC indicating that an AFR imbalance is present and illuminating a MIL on the dash of the vehicle, for example, to alert the vehicle operator to service the vehicle, and may further include indicating the reason for the MIL. However, as at 312, a conclusive determination as to the source of the AFR imbalance may not be indicated at 318.

Continuing to 320, method 300 includes operating in VDE mode and performing a power balance test to determine if the AFR imbalance is due to a degraded fuel injector. Operation in VDE mode will be described in further detail below with respect to FIG. 4 and includes selecting cylinders for deactivation. In some examples, the selected cylinders may include the cylinders of the engine bank that was indicated to be rich. A method for a power balance test with the cylinders of the rich bank deactivated during VDE mode is described with reference to FIG. 5. However, the ability to deactivate specific cylinders may be restricted by hardware of the VDE. Therefore, a method for a power balance test with a subset of cylinders from each bank deactivated in VDE mode is described with reference to FIG. 6. Following 320, method 300 ends.

Figure 4:
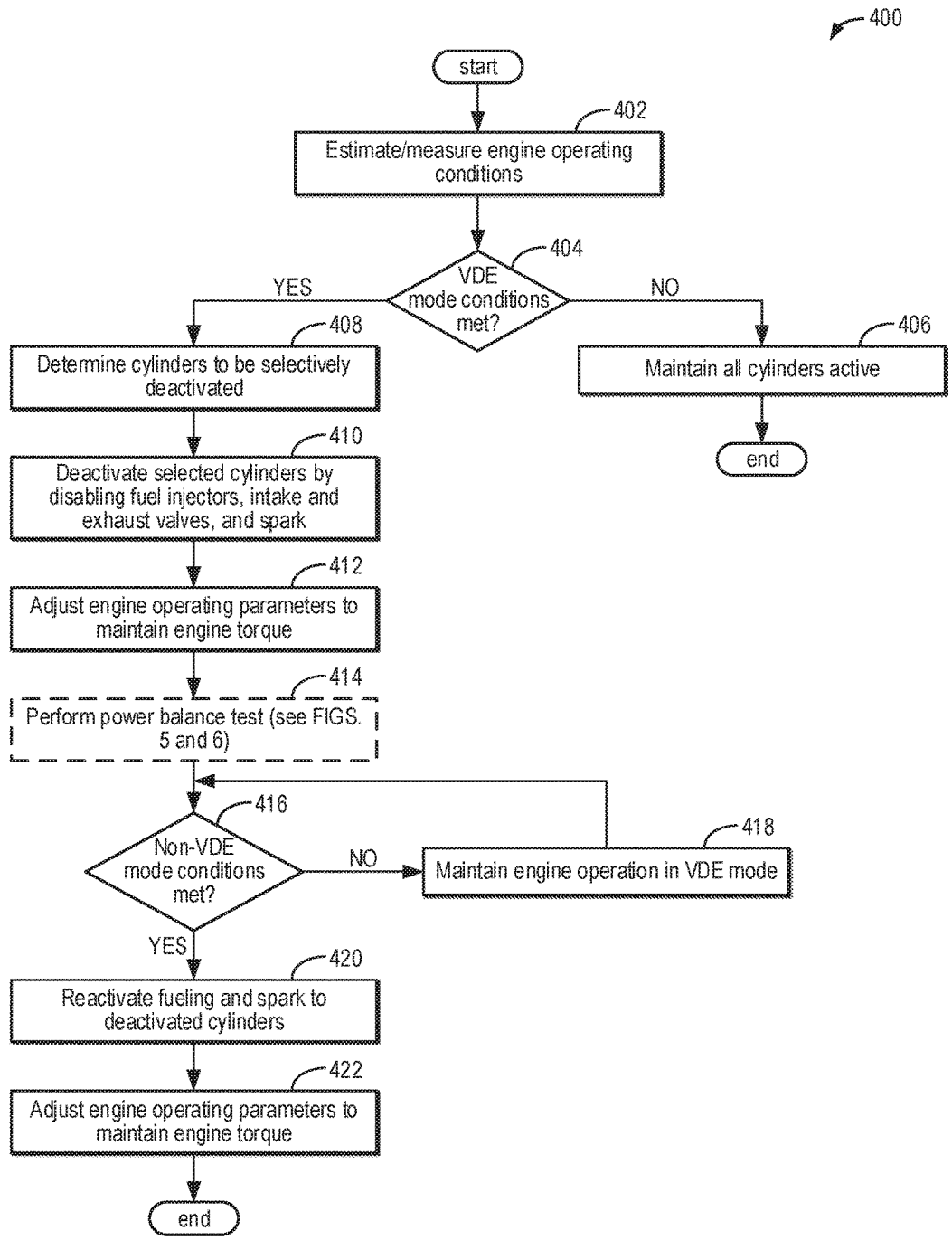
FIG. 4 shows a flow chart illustrating an example method for operating an engine in VDE mode.

FIG. 4 shows a method 400 for transitioning an engine (e.g., engine 10 of FIG. 2) to a VDE mode of operation. For example, the engine may be transitioned to the VDE mode of operation in order to increase fuel economy. In another example, the engine may be transitioned to the VDE mode of operation responsive to an indication of an AFR imbalance between two engine banks, as discussed above with regard to FIG. 3. If an AFR imbalance is indicated, transitioning to the VDE mode of operation may enable a controller (e.g., controller 12 of FIGS. 1 and 2) to identify a degraded fuel injector delivering undesired additional fuel using a power balance test, as will be discussed with regard to FIGS. 5 and 6.

Method 400 begins at 402 and includes estimating and/or measuring engine operating conditions. For example, operating conditions may include, but are not limited to, engine speed, desired torque (for example, from a pedal-position sensor), manifold pressure (MAP), manifold air flow (MAF), engine temperature, spark timing, intake manifold temperature, etc. Operating conditions may be measured by one or more sensors coupled to the controller such as a crankshaft position sensor (e.g., Hall effect sensor 118 of FIG. 1), a pedal position sensor (e.g., pedal position sensor 134 of FIG. 1), a MAP sensor (e.g., MAP sensor 122 of FIG. 1), etc.

At 404, it is determined if VDE mode conditions are met. For example, if torque demand is low, the controller may determine that one or more cylinders may be deactivated, with the torque demand met by the remaining active cylinders. In comparison, if the torque demand is high, the controller may determine that all cylinders need to remain active. Therefore, in one example, VDE mode conditions may be met if torque demand is less than a threshold.

If VDE mode conditions are not met, method 400 proceeds to 406 and includes maintaining all of the cylinders in an active mode undergoing combustion. For example, fuel injectors (e.g., fuel injector 66 of FIG. 1), intake and exhaust valves (e.g., intake valve 52 and exhaust valve 54 of FIG. 1), and spark ignition will remain active for each cylinder. Following 406, method 400 ends.

Returning to 404, if VDE mode conditions are met, method 400 proceeds to 408 and includes determining the cylinders to be selectively deactivated. The controller may select a group of cylinders and/or an engine bank to deactivate based on the estimated engine operating conditions. The selection may be based on, for example, which group of cylinders was deactivated during a previous VDE mode of operation. For example, if during the previous cylinder deactivation condition, a first group of cylinders on a first engine bank (e.g., first bank 15a of FIG. 2) were deactivated, then the controller may select a second group of cylinders on a second engine bank (e.g., second bank 15b of FIG. 2) for deactivation during the present VDE mode of operation. In another example, if dual HEGO sensor readings indicated that the first engine bank is rich relative to the second engine bank, as described with reference to FIG. 3, the cylinders of the first engine bank (e.g., cylinders 2, 4, 6, 8, as labeled in FIG. 2) may be selected for deactivation. In still another example, cylinder deactivation may be restricted to specific cylinders due to hardware of the engine. Using a V-8 engine as an example, the hardware may restrict deactivation to two specific cylinders from each engine bank (e.g., cylinders 4 and 6 from first bank 15a and cylinders 1 and 7 from second bank 15b), for example.

At 410, method 400 includes deactivating the selected cylinders by disabling respective fuel injectors, deactivating respective intake and exhaust valves, and disabling spark to the selected cylinders. In one example, exhaust gas from the previous charge burn may be trapped within the selected cylinders during deactivation. In another example, fresh air may be trapped within the selected cylinders to provide a lower torque impulse during deactivation by drawing air into the selected cylinders before closing the intake and exhaust valves. The intake and exhaust valves may be closed, for example, via a cam profile switching mechanism in which a cam with no lift is used or by actuating a valve deactivator (e.g., a VDE actuator), as described further with respect to FIG. 1.

At 412, method 400 includes adjusting engine operating parameters in order to maintain engine torque. For example, an opening of an intake throttle (e.g., throttle 62 of FIGS. 1 and 2) may be increased in order to increase airflow to the active cylinders and thereby maintain torque during VDE mode. Further, spark timing may be adjusted in the active cylinders. For example, spark may initially be retarded to minimize torque disturbances during the transition to VDE mode and then restored. Further still, valve timings may be adjusted in the active cylinders. For example, cam timing in the active cylinders may be modified, with camshafts positioned to achieve a desired cylinder air charge for delivering a demanded torque. Depending on demanded torque, in one example, exhaust cams may be retarded to allow exhaust residuals within active cylinders. In another example, intake cams may be advanced to enable increased volumetric efficiency in active cylinders. As such, the above adjustments may enable a desired airflow to maintain a desired engine torque.

Figure 5:
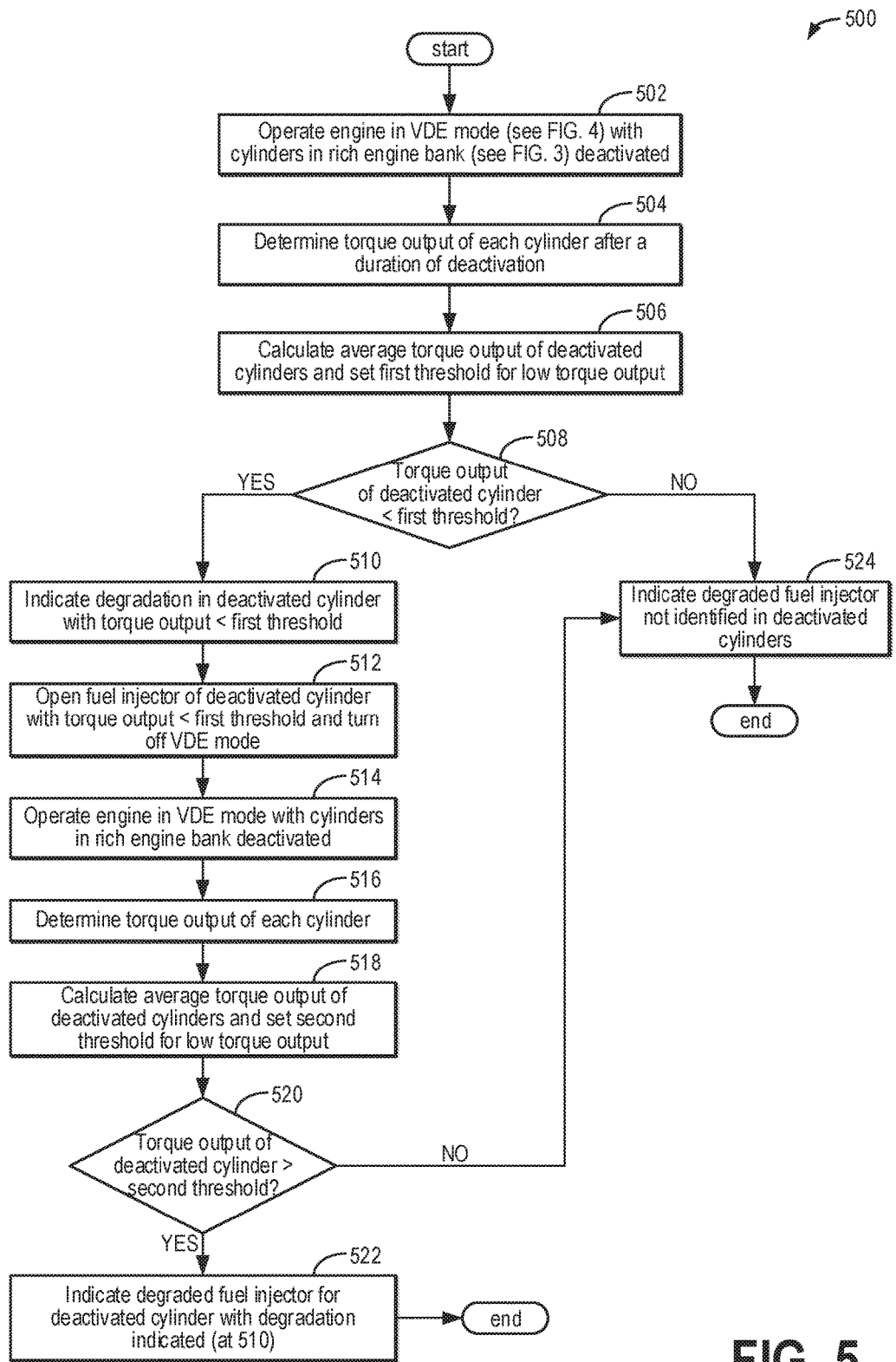
FIG. 5 shows a flow chart illustrating a first example method for performing a power balance test to identify a degraded fuel injector delivering undesired additional fuel in an engine operating in VDE mode.
Figure 6:
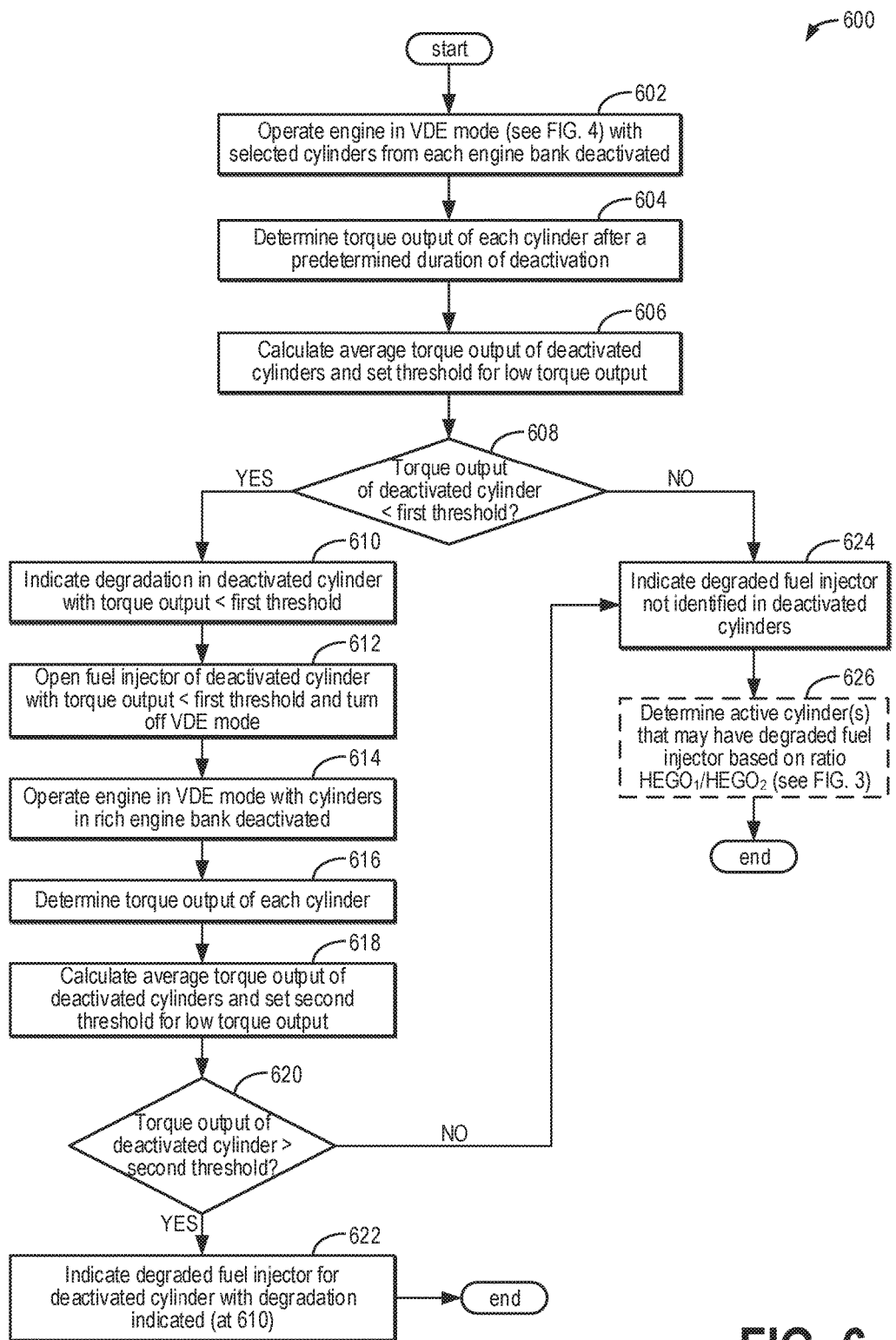
FIG. 6 shows a flow chart illustrating a second example method for performing a power balance test to identify a degraded fuel injector delivering undesired additional fuel in an engine operating in VDE mode.

At 414, method 400 optionally includes performing a power balance test, as described with respect to FIGS. 5 and 6. The power balance test may be performed, for example, responsive to an indication of an AFR imbalance between the two engine banks (e.g., as identified according to the method of FIG. 3). In another example, the power balance test may be performed responsive to an indication of a degraded fuel injector, such as responsive to a change in fuel rail pressure being greater than a threshold during non-fueling conditions.

At 416, it is determined if non-VDE mode conditions are met. In one example, non-VDE (e.g., reactivation) conditions may be met when the engine torque demand increases above a threshold. In another example, non-VDE conditions may be met when the engine has operated in the VDE mode for a specified duration. If non-VDE conditions are not met, method 400 proceeds to 418 and includes maintaining engine operation in VDE mode.

If non-VDE conditions are met at 416, method 400 proceeds to 420 and includes reactivating fueling and spark to the deactivated cylinders. Additionally, intake and exhaust valves of the deactivated cylinders are reactivated, for example, via the cam profile switching mechanism or by deactivating the valve deactivator, to allow fresh charge air to enter the cylinders and exhaust to exit the cylinders. Thereby, combustion resumes in the cylinders that were deactivated during VDE mode.

At 422, method 400 includes adjusting engine operating parameters to maintain engine torque. For example, the opening of the intake throttle may be decreased to allow the airflow to decrease when the cylinders are reactivated, decreasing the air charge and therefore the load to each cylinder due to more cylinders being available for combustion. In one example, the intake throttle may be adjusted to a closed position. In another example, the throttle opening may be reduced to allow sufficient airflow to the increased number of active cylinders while maintaining torque. At the same time, spark timing may be retarded to maintain a constant torque on all the cylinders, thereby reducing cylinder torque disturbances. When sufficient airflow is reestablished, spark timing may be restored. In addition to throttle and spark timing adjustments, valve timing may be adjusted at 422 to compensate for torque disturbances. Cam timings may be modified to deliver desired air charges to the cylinder(s) to provide demanded torque. In one example, if cylinder air charge is lighter, exhaust cam timing may be advanced to reduce residuals and ensure complete combustion. In another example, if a higher torque is demanded, intake cams may be fully advanced and exhaust cams may be retarded to provide lower dilution and increased power. Following 422, method 400 ends.

A power balance test measures the relative contribution of each cylinder to torque output. If the power balance test is performed while operating in VDE mode, a degraded fuel injector delivering undesired additional fuel may be identified. During VDE mode, air and/or exhaust gases from the previous charge burn are compressed during the upstroke of a piston within a deactivated cylinder and push down on the piston during the downstroke. The compression and decompression have an equalizing effect that does not affect engine output. However, if a fuel injector of the deactivated cylinder is degraded and delivers undesired fuel (e.g., the fuel injector has not fully shut off), fuel may accumulate inside of the sealed cylinder. Liquid fuel is incompressible, leading to a diminished torque output of the deactivated cylinder.

The power balance test may be performed, for example, responsive to an indication of an AFR imbalance between two engine banks, as described with reference to FIG. 3. The power balance test may pinpoint a degraded fuel injector delivering undesired additional fuel, as described below with reference to FIG. 5, or, depending on the number of cylinders and restrictions of the engine, narrow down which cylinders may be supplied by a degraded fuel injector, as described below with reference to FIG. 6.

Turning now to FIG. 5, a first example method 500 for performing a power balance test in an engine (e.g., engine 10 of FIGS. 1 and 2) operating in VDE mode is shown. Method 500 begins at 502 and includes operating the engine in VDE mode, as described with respect to FIG. 4, with cylinders of a rich engine bank deactivated. For example, a controller (e.g., controller 12 of FIGS. 1 and 2) may determine that a first engine bank (e.g., first bank 15a of FIG. 2) is rich relative to a second engine bank (e.g., second bank 15b of FIG. 2), as described with respect to FIG. 3. Therefore, the cylinders of the first engine bank may be deactivated. During VDE mode, the deactivated cylinders are sealed, as corresponding intake and exhaust valves are deactivated and in a closed position. Further, the deactivated cylinders are unfueled, with corresponding fuel injectors deactivated. However, if a fuel injector of a deactivated cylinder is degraded such that it is not fully shut off, liquid fuel may accumulate in the cylinder during the deactivation.

At 504, method 500 includes determining a torque output of each cylinder after a duration of deactivation (e.g., after a duration has elapsed during the deactivation). Torque output may be inferred based on engine speed during the power stroke of a cylinder, as measured by a crankshaft position sensor or any other sensor that gives an indication of engine speed (e.g., Hall effect sensor 118 of FIG. 1). For example, torque output may be calculated by the controller using a lookup table stored within a memory of the controller, with engine speed as the input and torque as the output. As another example, the controller may make a logical determination regarding the amount of torque generated based on logic rules that are a function of engine speed. In one example, the duration of deactivation is determined based on the magnitude of the AFR imbalance (e.g., the magnitude of the difference between $HEGO_1/HEGO_2$ and 1), with the duration of deactivation decreasing as the magnitude of the AFR imbalance increases. In another example, the duration of deactivation is the same for all magnitudes of the AFR imbalance.

In another example, the engine speed contribution of the power stroke of each cylinder may be used instead of torque output. In still another example, a relative compression test may be used. The relative compression test uses a high amperage current probe to measure battery current during a crank event, as a cylinder struggling to compress liquid will draw more current than healthy cylinders (e.g., the compression ratio decreases). The relative compression test may be an off-board, intrusive diagnostic. However, if the engine is part of a hybrid vehicle, such as vehicle system 100 of FIG. 1, an electric motor of the vehicle system (e.g., electric motor 152 of FIG. 1) may be used, making the relative compression test an on-board diagnostic for hybrid vehicles.

At 506, method 500 includes calculating an average torque output of the deactivated cylinders and setting a first threshold for low torque output. For example, the first threshold may be set relative to the average torque output such that any torque output below the first threshold is considered to be low torque output. Further, by setting the first threshold relative to the average torque output, the first threshold may vary based on engine speed and engine model, which may not be accounted for with an absolute threshold.

At 508, it is determined if the torque output of each deactivated cylinder is less than the first threshold. As described above, torque output is reduced by the presence of liquid fuel. Therefore, identifying a deactivated cylinder with a low torque output relative to the other deactivated cylinders may be indicative of liquid accumulation within the cylinder, which may be due to a degraded fuel injector delivering undesired additional fuel. However, low torque output may also be caused by other forms of cylinder degradation, such as degraded cylinder valves that are not fully closed.

If the torque output of a deactivated cylinder is less than the first threshold, method 500 proceeds to 510 and includes indicating degradation in the deactivated cylinder with the torque output that is less than the first threshold. For example, a malfunction indicator light (MIL) may be illuminated on a dash of the vehicle to alert a vehicle operator to service the vehicle and may further include indicating the reason for the MIL. Further, the controller may set a diagnostic trouble code (DTC) indicating the degraded cylinder. However, the source of the degradation may not be determined at 510.

At 512, method 500 includes opening the fuel injector of the deactivated cylinder with the torque output that is less than the first threshold and turning off VDE mode. Opening the fuel injector relieves a motive fuel rail pressure force, so if the injector is degraded and does not fully shut off, there will no longer be a pressure gradient to drive fuel delivery through the degraded injector. Intake and exhaust valves of the deactivated cylinders are reactivated, but spark and fueling remain disabled. With the intake and exhaust valves activated, any liquid within the cylinder is expelled toward the exhaust as the engine spins.

At 514, method 500 includes operating the engine in VDE mode with cylinders in the rich bank deactivated, as at 502. Operating the engine in VDE mode includes deactivating the corresponding intake and exhaust valves so that the deactivated cylinders are sealed. Further, the deactivated cylinders remain unfueled, with corresponding fuel injectors deactivated, and spark remains disabled.

At 516, method 500 includes determining the torque output of each cylinder, as described at 504. However, whereas method 500 includes determining the torque output of each cylinder after a duration of deactivation at 504, at 516, the torque output of each cylinder may be determined without waiting for the duration to elapse.

At 518, method 500 includes calculating an average torque output of the deactivated cylinders and setting a second threshold for low torque output. For example, the second threshold may be set relative to the average torque output such that any torque output below the second threshold is considered to be low torque output. In some examples, the second threshold is different than the first threshold (as determined at 506). In other examples, the second threshold may be the same value as the first threshold.

At 520, it is determined if the torque output of each deactivated cylinder is greater than the second threshold. As described above, torque output is reduced by the presence of liquid fuel, but may also be due to other forms of degradation, such as cylinder valves that are not fully closed. Therefore, by expelling any accumulated liquid from the cylinder at 512, if the low torque output determined at 508 was due to incompressible liquid within the cylinder, the torque output of the degraded cylinder is no longer reduced. However, if the torque output of the degraded cylinder remains low, the low torque output may be due to another source of degradation and not due to a degraded fuel injector that has not fully shut off.

If the torque output of each of the deactivated cylinders is greater than the second threshold, method 500 proceeds to 522 and includes indicating a degraded fuel injector for the deactivated cylinder with degradation indicated (at 510). For example, a MIL may be illuminated on the dash of the vehicle to alert the vehicle operator to service the vehicle and may further include indicating the reason for the MIL. Further, the controller may set a DTC indicating the exact cylinder with the degraded fuel injector. Following 522, method 500 ends.

If the torque output of each of the deactivated cylinders is not greater than the second threshold (e.g., the torque output of a deactivated cylinder is less than or equal to the second threshold), method 500 proceeds to 524 and includes indicating that a degraded fuel injector is not identified in the deactivated cylinders. For example, the degraded cylinder indicated at 510 may have another form of degradation, such as cylinder valves that are not fully closed. The controller may execute additional diagnostic methods to identify the source of the degradation. Following 524, method 500 ends.

Returning to 508, if the torque output of each deactivated cylinder is not less than the first threshold (e.g., the torque output of each deactivated cylinder is greater than or equal to the first threshold), method 500 proceeds to 524 and includes indicating that a degraded fuel injector is not identified in the deactivated cylinders. For example, if the VDE mode power balance test was performed responsive to an indication of an AFR imbalance between engine banks, the AFR imbalance may instead be caused by other factors, such as an intake manifold leak at a particular cylinder, an individual cylinder exhaust gas recirculation runner imbalance, or a fuel flow delivery problem. The controller may execute additional diagnostic methods to identify the source of the AFR imbalance. Following 524, method 500 ends.

Turning now to FIG. 6, a second example method 600 for performing a power balance test in an engine (e.g., engine 10 of FIGS. 1 and 2) operating in VDE mode is shown. Specifically, method 600 of FIG. 6 differs from method 500 of FIG. 5 in that method 600 may be performed if the engine cannot deactivate all of the cylinders of an engine bank during VDE mode. Furthermore, method 600 may be performed responsive to an indication of the engine running rich relative to a commanded AFR even if an AFR imbalance between engine banks is not identified (for example, if there is one upstream exhaust gas oxygen sensor) or any other indication of a degraded fuel injector being present in the engine.

Method 600 begins at 602 and includes operating the engine in VDE mode, as described with respect to FIG. 4, with selected cylinders from each engine bank deactivated. For example, in a V-8 engine, two cylinders from each engine bank may be deactivated (e.g., cylinders 4 and 6 of first bank 15*a* of FIG. 2 and cylinders 1 and 7 of second bank 15*b* of FIG. 2). During VDE mode, the deactivated cylinders are sealed, as corresponding intake and exhaust valves are deactivated, and corresponding fuel injectors are deactivated. However, if a fuel injector of a deactivated cylinder is degraded and delivering undesired additional fuel, liquid fuel may accumulate in the cylinder during the deactivation, as described above.

At 604, method 600 includes determining a torque output of each cylinder after a predetermined duration of deactivation. Torque output may be inferred based on engine speed during the power stroke of a cylinder, as measured by a crankshaft position sensor or any other sensor that gives an indication of engine speed (e.g., Hall effect sensor 118 of FIG. 1). For example, torque output may be calculated by the controller using a lookup table stored within a memory of the controller, with engine speed as the input and torque as the output. As another example, the controller may make a logical determination regarding the amount of torque generated based on logic rules that are a function of engine speed.

In another example, the engine speed contribution of the power stroke of each cylinder may be used instead of torque output. In still another example, a relative compression test may be used. The relative compression test uses a high amperage current probe to measure battery current during a crank event, as a cylinder struggling to compress liquid will draw more current than healthy cylinders (e.g., the compression ratio decreases). The relative compression test may be an off-board, intrusive diagnostic. However, if the vehicle system is a hybrid vehicle, such as vehicle system 100 of FIG. 1, an electric motor of the vehicle system (e.g., electric motor 152 of FIG. 1) may be used, making the relative compression test an on-board diagnostic for hybrid vehicles.

At 608, it is determined if the torque output of each deactivated cylinder is less than the first threshold. As described above, torque output is reduced by the presence of liquid fuel. Therefore, identifying a deactivated cylinder with a low torque output relative to the other deactivated cylinders may be indicative of liquid accumulation within the cylinder, which may be due to a degraded fuel injector delivering undesired additional fuel. However, low torque output may also be caused by other forms of cylinder degradation, such as degraded cylinder valves that are not fully closed.

If the torque output of a deactivated cylinder is less than the first threshold, method 600 proceeds to 610 and includes indicating degradation in the deactivated cylinder with the torque output that is less than the first threshold. For example, a MIL may be illuminated on a dash of the vehicle to alert a vehicle operator to service the vehicle and may further include indicating the reason for the MIL. Further, the controller may set a diagnostic trouble code (DTC) indicating the degraded cylinder. However, the source of the degradation may not be determined at 610.

At 612, method 600 includes opening the fuel injector of the deactivated cylinder with the torque output that is less than the first threshold and turning off VDE mode. Opening the fuel injector relieves a motive fuel rail pressure force, so if the injector is degraded and does not fully shut off, there will no longer be a pressure gradient to drive fuel delivery through the degraded injector. Intake and exhaust valves of the deactivated cylinders are reactivated, but spark and fueling remain disabled. With the intake and exhaust valves activated, any liquid within the cylinder is expelled toward the exhaust as the engine spins.

At 614, method 600 includes operating the engine in VDE mode with selected cylinders from each engine bank deactivated, as at 602 (e.g., the same cylinders deactivated at 602 are deactivated at 614). Operating the engine in VDE mode includes deactivating the corresponding intake and exhaust valves so that the deactivated cylinders are sealed. Further, the deactivated cylinders remain unfueled, with corresponding fuel injectors deactivated, and spark remains disabled.

At 616, method 600 includes determining the torque output of each cylinder, as described at 604. However, whereas method 600 includes determining the torque output of each cylinder after a duration of deactivation at 604, at 616, the torque output of each cylinder may be determined without waiting for the duration to elapse.

At 618, method 600 includes calculating an average torque output of the deactivated cylinders and setting a second threshold for low torque output. For example, the second threshold may be set relative to the average torque output such that any torque output below the second threshold is considered to be low torque output. In some examples, the second threshold is different than the first threshold (as determined at 606). In other examples, the second threshold may be the same value as the first threshold.

At 620, it is determined if the torque output of each deactivated cylinder is greater than the second threshold. As described above, torque output is reduced by the presence of liquid fuel, but may also be due to other forms of degradation, such as cylinder valves that are not fully closed. Therefore, by expelling any accumulated liquid from the cylinder at 612, if the low torque output determined at 608 was due to incompressible liquid within the cylinder, the torque output of the degraded cylinder is no longer reduced. However, if the torque output of the degraded cylinder remains low, the low torque output may be due to another source of degradation and not due to a degraded fuel injector that has not fully shut off.

If the torque output of each of the deactivated cylinders is greater than the second threshold, method 600 proceeds to 622 and includes indicating a degraded fuel injector for the deactivated cylinder with degradation indicated (at 610). For example, a MIL may be illuminated on the dash of the vehicle to alert the vehicle operator to service the vehicle and may further include indicating the reason for the MIL. Further, the controller may set a DTC indicating the exact cylinder with the degraded fuel injector. Following 622, method 600 ends.

If the torque output of each of the deactivated cylinders is not greater than the second threshold (e.g., the torque output of a deactivated cylinder is less than or equal to the second threshold), method 600 proceeds to 624 and includes indicating that a degraded fuel injector is not identified in the deactivated cylinders. For example, the degraded cylinder indicated at 610 may have another form of degradation, such as cylinder valves that are not fully closed.

Returning to 608, if the torque output of each deactivated cylinder is not less than the threshold (e.g., the torque output of each deactivated cylinder is greater than or equal to the threshold), method 600 proceeds to 624 and includes indicating that a degraded fuel injector is not identified in the deactivated cylinders.

At 626, method 600 optionally includes determining one or more active cylinders that may have a degraded fuel injector delivering undesired additional fuel based on the ratio of $HEGO_1$ and $HEGO_2$, the outputs of a first and second HEGO sensor, respectively, as described with respect to FIG. 3. For example, in an eight cylinder VDE engine, if deactivation is restricted to cylinders 1, 4, 6, and 7 (as labeled in FIG. 2), it may be determined that cylinders 2 and/or 8 may have a degraded fuel injector if the first HEGO sensor reads rich relative to the second HEGO sensor or that cylinders 3 and/or 5 may have a degraded fuel injector if the second HEGO sensor reads rich relative to the first HEGO sensor. In a four cylinder VDE engine, the exact cylinder may be determined because there are fewer combinations of cylinders. A MIL may be illuminated on a dash of the vehicle to alert the vehicle operator to service the vehicle, for example, and may further include indicating the reason for the MIL. Further, the controller may set a DTC indicating cylinders that may have a degraded fuel injector. However, in the case of the eight cylinder VDE engine, the power balance test may not be able to conclusively determine that a degraded fuel injector was the source of the AFR imbalance, which may instead be caused by other factors, such as an intake manifold leak at a particular cylinder, an individual cylinder exhaust gas recirculation runner imbalance, or a fuel flow delivery problem. The controller may execute additional diagnostic methods to identify the source of the AFR imbalance.

However, method 600 may be performed responsive to an indication of an engine running rich without additional information about which engine bank is rich (e.g., one upstream exhaust gas oxygen sensor is present) or responsive to an indication of a degraded fuel injector, and as such, 626 may be omitted. The controller may repeat method 600 with the opposite cylinders deactivated (e.g., the cylinders that were active are deactivated and the cylinders that were deactivated are active), if able. Thus, whereas an indication of an AFR imbalance between engine banks may help speed the diagnostic process, it is not required for diagnosing a degraded fuel injector using a power balance test in the VDE mode of operation.

Following 626, method 600 ends.

FIG. 7 shows a graph 700 of an example power balance test that may be used to identify a cylinder with a degraded fuel injector delivering undesired additional fuel in a V-8 engine operating in VDE mode. Cylinder number is shown on the X-axis, and the Y-axis represents torque output, with torque output increasing from bottom to top. The torque output of each cylinder is shown in plot 702, with the average maximum torque output (e.g., during the power stroke) produced by deactivated cylinders represented by dashed line 704. In the example of graph 700, the cylinder firing order is 8-4-3-6-5-7-2-1. Cylinders 4 and 6, located within a first engine bank (e.g., first bank 15a of FIG. 2) and 7 and 1, located within a second engine bank (e.g., second bank 15b of FIG. 2) are deactivated.

As shown in plot 702, the active cylinders (e.g., 8, 3, 5, and 2) have higher torque output than the deactivated cylinders. All of the deactivated cylinders have roughly equivalent torque output, which is higher than a threshold for identifying a cylinder with low torque output, represented by dashed line 706. Therefore, degradation is not indicated in the deactivated cylinders. In contrast, dashed segment 708 shows decreased torque output for cylinder 4, which is below threshold 706. Therefore, degradation of cylinder 4 is indicated. The power balance test may be repeated after expelling potential liquid accumulated within cylinder 4, as described with respect to FIGS. 5 and 6, to more conclusively identify the source of the low torque output as due to a degraded fuel injector delivering undesired additional fuel. Thus, if the torque output of cylinder 4 is above the threshold represented by dashed line 706 when the power balance test is repeated (as in plot 702), a degraded fuel injector for cylinder 4 is indicated.

If a power balance test shows equal torque output for deactivated cylinders, as demonstrated by plot 702, but an AFR imbalance between engine banks is indicated (as described above with reference to FIG. 3), a degraded fuel injector delivering undesired additional fuel may be present in an active cylinder, as discussed with regard to FIG. 6. In the example of FIG. 7, if the first engine bank is rich relative to the second engine bank, cylinders 2 or 8 may have a degraded fuel injector delivering undesired additional fuel. If the second engine bank is rich relative to the first engine bank, cylinders 3 or 5 may have a degraded fuel injector delivering undesired additional fuel.

FIG. 8 shows a graph 800 illustrating an example of transitioning an engine to VDE mode to identify a degraded fuel injector delivering undesired additional fuel responsive to an indication of an AFR imbalance. For example, the AFR imbalance may be indicated according to the method of FIG. 3, the engine transitioned to VDE mode according to the method of FIG. 4, and a power balance test performed to identify the degraded fuel injector according to the method of FIG. 6. A filtered ratio of $HEGO_1$ and $HEGO_2$ ($HEGO_1/HEGO_2$) is shown at plot 802; an indication of an AFR imbalance is shown at plot 808; an engine mode of operation is shown at plot 810; an activation state of cylinders 1, 4, 6, and 7 is shown at plot 812; an activation state of cylinders 2, 3, 5, and 8 is shown at plot 814; estimated fuel accumulation is shown at plot 816 for cylinder 1, plot 818 for cylinder 4, plot 820 for cylinder 6, and plot 822 for cylinder 7; and an indication of a degraded fuel injector is shown at plot 826. Furthermore, dashed line 804 represents a ratio of $HEGO_1$ and $HEGO_2$ equal to one, dashed line 806a represents a first threshold for indicating an AFR imbalance, dashed line 806b represents a second threshold for indicating an AFR imbalance, and dashed line 824 represents a threshold amount of accumulated fuel in a deactivated cylinder. For all of the above, the X-axis represents time, with time increasing from left to right. The Y-axis refers to the labeled parameter, with values increasing from bottom to top except for plot 808, in which the indication of an AFR imbalance is "on" or "off"; plot 810, in which the mode of operation is indicated as "VDE" or "non-VDE"; plot 812 and plot 814, in which the corresponding cylinders are indicated as "on" (activated) or "off" (deactivated); and plot 826, in which the indication of a degraded fuel injector is "off" or specified by cylinder number.

In the example of FIG. 8, the engine (e.g., engine 10 of FIG. 2) is an eight cylinder engine with two engine banks of four cylinders each. Cylinders 2, 4, 6, and 8 comprise a first engine bank (e.g., first bank 15a of FIG. 2), and cylinders 1, 3, 5, and 7 comprise a second engine bank (e.g., second bank 15b of FIG. 2). Further, as described with respect to FIG. 2, a first HEGO sensor (e.g., HEGO sensor 128 of FIG. 2) is positioned to measure a concentration of oxygen in zoned exhaust from the first engine bank, outputting a signal $HEGO_1$, and a second HEGO sensor (e.g., HEGO sensor 129 of FIG. 2) is positioned to measure a concentration of oxygen in zoned exhaust from the second engine bank, outputting a signal $HEGO_2$.

At t0, the engine is operated in non-VDE mode (plot 810), with all cylinders active, as shown in plot 812 and plot 814. Furthermore, the ratio of $HEGO_1$ and $HEGO_2$ (plot 802) is equal to one (dashed line 804), indicating that exhaust gas from the first engine bank and exhaust gas from the second engine bank have equivalent oxygen concentrations. Thus, an AFR imbalance is not indicated (plot 808). With all cylinders active, fuel is not anticipated to accumulate in any of the cylinders, as illustrated by baseline levels of plot 816, plot 818, plot 820, and plot 822, and there is no indication of a degraded fuel injector, as shown by the "off" position of plot 826. Estimated fuel accumulation may be a prophetic example, as fuel accumulation within a cylinder may not be a physically measurable parameter. However, in other examples, a controller (e.g., controller 12 of FIGS. 1 and 2) may estimate the amount of fuel accumulated in a cylinder.

Between t0 and t1, the first HEGO sensor begins to read rich relative to the second HEGO sensor, as indicated by the ratio of $HEGO_1$ and $HEGO_2$ (plot 802) becoming greater than one (dashed line 804). Responsive to the ratio of $HEGO_1$ and $HEGO_2$ (plot 802) becoming greater than the first threshold (dashed line 806a), an AFR imbalance is indicated (plot 808). Further, the ratio of $HEGO_1$ and $HEGO_2$ being greater than the first threshold indicates that the first engine bank is rich relative to the second engine bank. Conversely, if the ratio of $HEGO_1$ and $HEGO_2$ was less than the second threshold (dashed line 806b), it would be indicated that the second engine bank was rich relative to the first engine bank. Thus, the first threshold (dashed line 806a) and the second threshold (dashed line 806b) create a threshold range centered at one (dashed line 804).

At t1, the engine transitions to operating in VDE mode (plot 810), as described with reference to FIG. 4. During VDE mode, cylinders 1, 4, 6, and 7 are deactivated (plot 812) and cylinders 2, 3, 5, and 8 remain on (plot 814). If a deactivated cylinder is fueled by a degraded fuel injector that does not fully shut off, liquid fuel may begin to accumulate in the cylinder. Between t1 and t2, the ratio of $HEGO_1$ and $HEGO_2$ decreases, as shown in plot 802, and returns to one (dashed line 804). Responsive to the ratio of $HEGO_1$ and $HEGO_2$ decreasing below threshold 806a, the indication of the AFR imbalance is turned off (plot 808). The return of the ratio of $HEGO_1$ and $HEGO_2$ to one implies that one of the deactivated cylinders was causing the first engine bank to run richer than the second engine bank, which may be due to a degraded fuel injector delivering more fuel than requested. Of the deactivated cylinders, cylinders 4 and 6 are in the first engine bank. Therefore, if the first engine bank is running rich due to a degraded fuel injector delivering undesired additional fuel, then the location of the degraded fuel injector is narrowed down to either cylinder 4 or cylinder 6.

Between t1 and t2, as the engine is operated in VDE mode, fuel begins to accumulate in cylinder 4, as illustrated in plot 818. Fuel does not accumulate in cylinder 1 (plot 816), cylinder 6 (plot 820), or cylinder 7 (plot 822). The estimated fuel accumulation in cylinder 4 surpasses the threshold indicated by dashed line 824, above which a cylinder will exhibit a diminished torque output during a power balance test.

At t2, a power balance test is performed, as described with reference to FIGS. 5 and 6 and an example of which is illustrated in FIG. 7. As a result of the estimated fuel accumulation in cylinder 4 being greater than threshold 824, the power balance test identifies cylinder 4 as having a diminished torque output relative to the other deactivated cylinders.

Between t2 and t3, the engine continues operation in VDE mode (plot 810). As such, fuel continues to accumulate in deactivated, sealed cylinder 4, as illustrated by a positive slope of plot 818. At t3, responsive to conditions being met to exit VDE mode (as described with respect to FIG. 4), the engine switches from the VDE mode to the non-VDE mode of operation (plot 810). In the non-VDE mode of operation, cylinders 1, 4, 6, and 7 are activated (plot 812) and cylinders 2, 3, 5, and 8 remain active (plot 814). As such, intake and exhaust valves are active.

Beginning at t3, reactivation of cylinder 4 causes the fuel that accumulated in cylinder 4 during deactivation (plot 818) to be expelled toward the exhaust. As a result, the first HEGO sensor reads rich relative to the second HEGO sensor, as shown in plot 802. Responsive to the ratio of $HEGO_1$ and $HEGO_2$ (plot 802) being greater than threshold 806a, an AFR imbalance is again indicated (plot 808). After the accumulated fuel is expelled, the ratio of $HEGO_1$ and $HEGO_2$ (plot 802) again drops below threshold 806a, and the indication of the AFR imbalance (plot 808) is turned off.

At t4, the engine is transitioned back to the VDE mode of operation (plot 810), with cylinders 1, 4, 6, and 7 again deactivated, as shown in plot 812. The power balance test is repeated, as described with reference to FIGS. 5 and 6. As a result of the estimated fuel accumulation in cylinder 4 being lower than threshold 824, the torque output of the deactivated cylinders is roughly equivalent (e.g., is roughly equal to an average torque output of the deactivated cylinders). Therefore, due to diminished torque output during the first power balance test (as performed at t2) and average torque output during the second power balance test, a degraded fuel injector is indicated for cylinder 4 (plot 826).

In this way, VDE mode may be utilized to pinpoint a degraded fuel injector that does not fully shut off and delivers undesired additional fuel to a cylinder, streamlining a diagnostic and repair procedure. If hardware does not allow the cylinder with the degraded injector to be deactivated, the methods described herein may be used to rule out cylinders that do not have a degraded fuel injector, which also streamlines the diagnostic and repair procedure. Although it may be beneficial to first detect an AFR imbalance using output from dual HEGO sensors, performing a power balance test in VDE mode may identify a degraded fuel injector supplying undesired fuel to a deactivated cylinder even with no prior indication of the AFR imbalance.

The technical effect of operating an engine in VDE mode for a duration and performing a power balance test is that a degraded fuel injector delivering undesired additional fuel may be identified.

One example method comprises, responsive to an indication of an air-fuel combustion gas imbalance from cylinders of an internal combustion engine, deactivating a subset of the cylinders, including deactivating fuel injectors delivering fuel to the cylinder subset; and inferring a first output of each of the cylinders during the deactivation after a duration of deactivation has elapsed. In the preceding example, additionally or optionally, the method further comprises at least one intake valve, at least one exhaust valve, and a spark plug for each of the cylinders, and wherein the deactivation includes closing the intake valve(s) and exhaust valve(s) and not delivering electrical power to the spark plug of each of the deactivated cylinders. In any or all of the preceding examples, the method may additionally or optionally comprise indicating that one of the fuel injectors of the cylinder subset has not fully shut off in response to the deactivated cylinder first output being lower than a threshold output. In any or all of the preceding examples, the method may additionally or optionally comprise reactivating the subset of cylinders for a duration to expel any liquid fuel; deactivating the subset of cylinders; inferring a second output of each of the cylinders during the deactivation; and indicating that one of the fuel injectors of the cylinder subset has not fully shut off in response to the deactivated cylinder first output being lower than a threshold output and the deactivated cylinder second output being higher than the threshold output. In any or all of the preceding examples, the method may additionally or optionally comprise indicating that one of the fuel injectors may be degraded and delivering undesired additional fuel in a subset of cylinders that is not deactivated responsive to the indication of the air-fuel combustion gas imbalance remaining during the deactivation. In any or all of the preceding examples, additionally or optionally, inferring the output of each of the cylinders comprises one or more of inferring an engine speed contribution of each of the cylinders and inferring torque output of each of the cylinders, and the threshold output is one or more of a predetermined amount less than an average engine speed contribution of the deactivated cylinders and a predetermined amount less than an average torque output of the deactivated cylinders. In any or all of the preceding examples, the method may additionally or optionally comprise an exhaust passage, an emission control device, and two exhaust gas oxygen sensors positioned symmetrically opposite each other within the exhaust passage upstream of the emission control device and downstream of the cylinders, and wherein the indication of the air-fuel combustion gas imbalance includes a ratio of time-aligned readings of the two exhaust gas oxygen sensors being outside of a threshold range centered at one. In any or all of the preceding examples, additionally or optionally, the duration of deactivation is determined based on a magnitude of a difference of the ratio of time-aligned readings of the two exhaust gas oxygen sensors and one, with the duration of deactivation decreasing as the magnitude increases.

Another example method comprises, responsive to an indication that more fuel is supplied to cylinders of an internal combustion engine than commanded, deactivating a subset of cylinders, sealing each cylinder of the subset of cylinders, deactivating fuel injectors delivering fuel to the cylinder subset, and deactivating spark plugs providing spark to the cylinder subset; inferring a first output of each of the cylinders after a predetermined duration has elapsed during the deactivation; and responsive to the first output of a deactivated cylinder being less than a threshold output, indicating that the deactivated cylinder is degraded. In the preceding example, additionally or optionally, the method further comprises reactivating the subset of cylinders; deactivating the subset of cylinders and inferring a second output of each cylinder; and responsive to the first output of a deactivated cylinder being less than the threshold output and the second output of the deactivated cylinder being greater than the threshold output, indicating that the fuel injector delivering fuel to the deactivated cylinder is degraded. In any or all of the preceding examples, additionally or optionally, the method further comprises at least one intake valve and at least one exhaust valve for each of the cylinders, and wherein sealing the cylinders includes closing the intake valve(s) and exhaust valve(s). In any or all of the preceding examples, additionally or optionally, the indication that more fuel is supplied to cylinders of the internal combustion engine than commanded is based on a fuel rail pressure decreasing by more than a threshold during non-fueling conditions. In any or all of the preceding examples, additionally or optionally, the output is one or more of an engine speed contribution and a torque output.

Another example system for a vehicle comprises an engine comprising a plurality of cylinders coupled to a crankshaft, each cylinder comprising a piston, one or more intake valves, one or more exhaust valves, and a fuel injector; a fuel tank coupled to a fuel delivery system configured to pressurize fuel delivered to the fuel injectors; one or more exhaust sensors coupled within an engine exhaust upstream of an emission control device; and a controller holding executable instructions stored in non-transitory memory, that when executed, cause the controller to: determine the presence of a rich fuel condition based on output from the one or more exhaust sensors; selectively deactivate a subset of cylinders during a deactivation test period, including deactivating fuel injectors delivering fuel to the cylinder subset; and seal the subset of cylinders, including deactivating the one or more intake valves and the one or more exhaust valves of each cylinder of the cylinder subset, in which the one or more intake valves and the one or more exhaust valves remain closed during the deactivation test period. In the preceding example, additionally or optionally, the system further comprises an electric machine configured to rotate the crankshaft of the engine during the deactivation test period, and wherein current draw of the electric machine is measured during a compression stroke of each cylinder. In any or all of the preceding examples, additionally or optionally, the controller further includes instructions to indicate that a fuel injector delivering fuel to a cylinder of the cylinder subset has not fully shut off responsive to the current draw during the compression stroke of the cylinder being greater than a threshold. In any or all of the preceding examples, additionally or optionally, the controller further includes instructions to perform a first power balance test during the deactivation test period; reactivate the subset of cylinders to expel any liquid fuel from the subset of cylinders; deactivate the subset of cylinders and perform a second power balance test; and indicate that a fuel injector delivering fuel to a cylinder of the cylinder subset has not fully shut off responsive to the first power balance test indicating low output of the cylinder and the second power balance test indicating average output of the cylinder. In any or all of the preceding examples, additionally or optionally, the power balance test includes inferring a torque output of each cylinder and low output comprises the torque output being less than a threshold torque output. In any or all of the preceding examples, additionally or optionally, the engine comprises a first engine bank and a second engine bank and the subset of cylinders includes the cylinders of the first engine bank. In any or all of the preceding examples, additionally or optionally, the engine comprises a first engine bank and a second engine bank and the subset of cylinders includes cylinders of each engine bank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to an indication of an air-fuel combustion gas imbalance from cylinders of an internal combustion engine, deactivating a subset of the cylinders, including deactivating fuel injectors delivering fuel to the cylinder subset; and
inferring a first output of each of the cylinders during the deactivation after a duration of deactivation has elapsed.

2. The method of claim 1, further comprising at least one intake valve, at least one exhaust valve, and a spark plug for each of the cylinders, and wherein the deactivation includes closing the intake valve(s) and the exhaust valve(s) and not delivering electrical power to the spark plug of each of the deactivated cylinders.

3. The method of claim 2, further comprising indicating that one of the fuel injectors of the cylinder subset has not fully shut off in response to the deactivated cylinder first output being lower than a threshold output.

4. The method of claim 2, further comprising:
reactivating the subset of cylinders for a duration to expel any liquid fuel;
deactivating the subset of cylinders;
inferring a second output of each of the cylinders during the deactivation; and
indicating that one of the fuel injectors of the cylinder subset has not fully shut off in response to the deactivated cylinder first output being lower than a threshold output and the deactivated cylinder second output being higher than the threshold output.

5. The method of claim 2, further comprising indicating that one of the fuel injectors is degraded and delivering undesired additional fuel in a subset of cylinders that is not deactivated responsive to the indication of the air-fuel combustion gas imbalance remaining during the deactivation.

6. The method of claim 4, wherein inferring an output of each of the cylinders comprises one or more of inferring an engine speed contribution of each of the cylinders and inferring torque output of each of the cylinders, and the threshold output is one or more of a predetermined amount less than an average engine speed contribution of the deactivated cylinders and a predetermined amount less than an average torque output of the deactivated cylinders.

7. The method of claim 1, further comprising an exhaust passage, an emission control device, and two exhaust gas oxygen sensors positioned symmetrically opposite each other within the exhaust passage upstream of the emission control device and downstream of the cylinders, and wherein the indication of the air-fuel combustion gas imbalance includes a ratio of time-aligned readings of the two exhaust gas oxygen sensors being outside of a threshold range centered at one.

8. The method of claim 7, wherein the duration of deactivation is determined based on a magnitude of a difference of the ratio of time-aligned readings of the two exhaust gas oxygen sensors and one, with the duration of deactivation decreasing as the magnitude increases.

9. A method, comprising:
responsive to an indication that more fuel is supplied to cylinders of an internal combustion engine than commanded, deactivating a subset of cylinders, sealing each cylinder of the subset of cylinders, deactivating fuel injectors delivering fuel to the cylinder subset, and deactivating spark plugs providing spark to the cylinder subset;
inferring a first output of each of the cylinders after a predetermined duration has elapsed during the deactivation; and
responsive to the first output of a deactivated cylinder being less than a threshold output, indicating that the deactivated cylinder is degraded.

10. The method of claim 9, further comprising:
reactivating the subset of cylinders;
deactivating the subset of cylinders and inferring a second output of each cylinder; and
responsive to the first output of a deactivated cylinder being less than the threshold output and the second output of the deactivated cylinder being greater than the threshold output, indicating that a fuel injector delivering fuel to the deactivated cylinder is degraded.

11. The method of claim 9, further comprising at least one intake valve and at least one exhaust valve for each of the cylinders, and wherein sealing the cylinders includes closing the intake valve(s) and the exhaust valve(s).

12. The method of claim 9, wherein the indication that more fuel is supplied to cylinders of the internal combustion engine than commanded is based on a fuel rail pressure decreasing by more than a threshold during non-fueling conditions.

13. The method of claim 9, wherein an output is one or more of an engine speed contribution and a torque output.

* * * * *